G. SPINNEY.
Bee Hive.
No. 50,179. Patented Sept. 26, 1865.
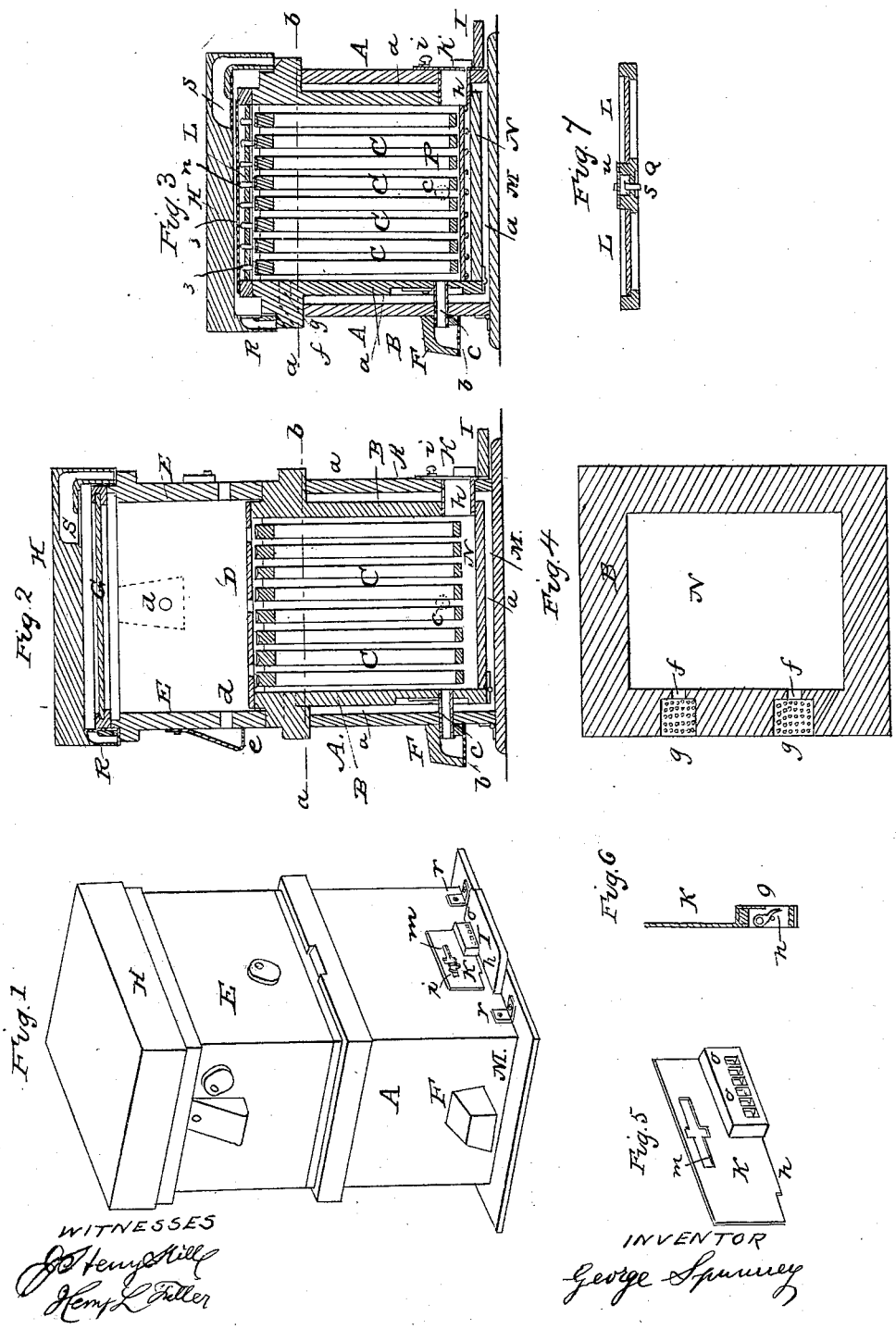

UNITED STATES PATENT OFFICE.

GEORGE SPINNEY, OF SAUGUS, MASSACHUSETTS.

IMPROVEMENT IN BEE-HIVES.

Specification forming part of Letters Patent No. 50,179, dated September 26, 1865.

*To all whom it may concern:*

Be it known that I, GEORGE SPINNEY, of Saugus, in the county of Essex and State of Massachusetts, have invented certain new and useful Improvements in Bee-Hives; and I do hereby declare that the following is a full, clear, and exact description of the construction and operation of the same, reference being had to the accompanying drawings, in which—

Figure 1 represents a perspective view of my improved bee-hive when arranged for summer use. Fig. 2 represents a vertical central section through the same. Fig. 3 represents a vertical central section through my bee-hive when arranged for winter use. Fig. 4 represents a horizontal section through the line $a\ b$ of Figs. 2 and 3. Figs. 5, 6, and 7 represent detached views hereinafter to be referred to.

My bee-hive is constructed in such a manner that it can be changed for summer and winter use, and I will first describe it when arranged for summer use, as shown in Figs. 1 and 2.

The lower part of my hive consists of two boxes, A B, one within the other, and with a dead-air space, $a$, between the two, which completely surrounds the inner box, B, the hive being thus kept cool in summer and warm in winter.

The swinging frames C are placed into the inner chamber, B, and on the top of the latter is the perforated honey-board D, through which the bees can pass to work in the upper chamber, E, which may also be filled with swinging frames or with boxes to contain the honey; and the honey-board protects the bees from being disturbed too much when the honey is to be removed from the chamber E.

It is of great importance to have the bee-hive well ventilated in summer and winter, and the difficulty in this respect is that the bees frequently clog up the screens which protect the ventilating passages against the entrance of moths, &c. I have succeeded in avoiding this difficulty by arranging the air-passages in such a manner that the screens which protect them at the outside are not set opposite or near said passages.

On the lower part of the hive I employ the ventilators F, which are attached to three sides of the hive, have the air-passages opening from below, which latter are protected by the screens $b$. The tube $c$ extends from the ventilator F to the inner box, B, whence the current of air passes up through said box, through the openings of the honey-board D; thence through the passages $d$ of the upper box, E, which are also protected by screens $e$, arranged horizontally, as shown at Fig. 2. I also use two other ventilating-passages, $f$, arranged as shown in a horizontal section at Fig. 4 and in dotted lines at Figs. 2 and 3, which are protected at their lower sides by screens $g$. Thus I obtain a perfect ventilation of the hive, which is not liable to be interrupted.

Box E is covered by a glass plate, G, and that by a cover, H.

I represents the fly-stand. It is secured to the hive by means of a tin mouth-piece, $h$, which extends into the inner box, B, as shown at Figs. 2 and 3.

K represents a metal guard to the fly-hole, which is fastened to the hive by means of a thumb-screw, $i$, passing through a cross-slot, $m$. The guard is shown in an enlarged view at Figs. 5 and 6.

In case it is desired to destroy the drones the edge 2 of the guard is raised sufficiently over the lower edge of the fly-hole to permit the worker bees to pass freely in and out, but not the drones. The latter pass out through the fly-holes $o$, which are provided with drop-valves $n$, (shown at Fig. 6,) and which open outward only, and not inward, and consequently the drones are prevented from returning to the hive, and perish.

In case it is desired to prevent the robbing of the hive the guard K is lowered and adjusted laterally, so as to leave an opening sufficient only to admit one bee at a time, as represented at Fig. 1, and in this way the robber bees can enter the hive only slowly and will be destroyed by the bees within. The guard K can also be adjusted so as to cover the entire fly-hole, and the valve-holes $o$ can be stopped by placing a board in front of them.

To arrange the hive for winter use I remove the upper chamber, E, and the honey-board D. I then apply in place of the latter the glass ventilating-cover L, (shown in a cross-section at Fig. 7,) and cover the hive with the top H. This done I open the hinged bottom M of the chamber A and the hinged bottom N of the chamber B, and I insert the board P below the swinging frames C, and close up the two bottoms, and the several parts are brought into the position represented at Fig. 3. The thickness of board P is such that when inserted the frames C nearly touch it, and in winter when bees happen to drop from the frames they are thus enabled to reach them again easily and to return to them, while otherwise, if they cannot conveniently reach the frames after having fallen to the bottom, they will move toward the fly-hole, become chilled, and die, and a great many bees perish in winter for this reason.

When the hive is to be transported the position of the board P is reversed, so that the strips $s$ will come, respectively, between the frames C, and thus hold them in a fixed position, which will be effected by inserting strips of wood of the necessary thickness under the board P.

The ventilating glass cover L consists in a frame holding the glass plates L and in a center or wooden part, Q, which has a number of holes, 3, and is covered with a ventilating-screen, $u$. The holes 3 may be closed partially or all by inserting plugs therein. In this winter arrangement of the hive the ventilating-currents pass through the ventilators F and $f$, and escape through the air-passages R and S made in the cover H, and which are also protected by screens to prevent moths, &c., from entering the hive.

As shown at Figs. 2 and 3, the upper faces of the swinging frames C are made concave, so as to constitute small gutters, by removing the ventilating-screen $u$ and by inserting a funnel into one of the holes, 3, which is opposite one of the frames C. The food for the bees in winter can be introduced and will collect in the cavity on the top of the frame. The hinged bottoms M N of the chambers A B are secured to the sides of said chambers by fastenings $r$ or otherwise.

The outer casing of the lower part of the hive may be made with doors and the sides of the inner chamber, B, may be fitted with glass, so that by opening the outer casing the operations of the inmates can be examined.

The top board of cover H can be made to project out far enough beyond the box E to permit the ventilating tubes or holes to be made in said cover, so as to be protected from the rain and snow by said projection.

Having thus fully described the nature of my invention, what I claim herein as new, and desire to secure by Letters Patent, is—

1. Arranging the two boxes of a double-box bee-hive in such a manner that a dead-air space shall be left between the two and surrounding the inner box at all its sides and bottom, substantially as and for the purposes described.

2. In combination with the swinging frames C, the board P, to be applied for winter use or in transporting the hive, substantially as herein described.

3. The ventilating-cover H, when constructed with air-passages R and S and double inner and outer protecting-screens, as herein described.

GEORGE SPINNEY.

Witnesses:
 THOS. H. DODGE,
 H. L. FULLER.